(12) United States Patent
Mendez et al.

(10) Patent No.: US 10,970,422 B2
(45) Date of Patent: *Apr. 6, 2021

(54) SYSTEMS AND METHODS FOR MASKING USER INPUT AND SENSOR DATA AT A USER DEVICE

(71) Applicant: Verizon Patent and Licensing Inc., Arlington, VA (US)

(72) Inventors: Bruno Mendez, Springfield, NJ (US); Manuel Enrique Caceres, Basking Ridge, NJ (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 0 days.

This patent is subject to a terminal disclaimer.

(21) Appl. No.: 16/684,195

(22) Filed: Nov. 14, 2019

(65) Prior Publication Data
US 2020/0082129 A1 Mar. 12, 2020

Related U.S. Application Data

(63) Continuation of application No. 15/719,233, filed on Sep. 28, 2017, now Pat. No. 10,509,922.

(51) Int. Cl.
*G06F 21/83* (2013.01)
(52) U.S. Cl.
CPC .................. *G06F 21/83* (2013.01)
(58) Field of Classification Search
None
See application file for complete search history.

(56) References Cited

U.S. PATENT DOCUMENTS

| 6,334,189 B1 * | 12/2001 | Granger | G06F 21/123 380/255 |
| 7,779,062 B2 * | 8/2010 | Waterson | G06F 21/554 709/200 |
| 9,643,722 B1 | 5/2017 | Myslinski | |
| 2003/0130893 A1 | 7/2003 | Farmer | |
| 2004/0230802 A1 * | 11/2004 | Moon | H04N 19/467 713/176 |

(Continued)

FOREIGN PATENT DOCUMENTS

| CN | 104008346 | * | 8/2014 | ......... G06F 21/6245 |

OTHER PUBLICATIONS

Youtube ("Lukas Graham—Piano Cover Video by YourPianoCover", found at https://www.youtube.com/watch?v=aLmEowCi4HA, Mar. 2016). (Year: 2016).*

(Continued)

*Primary Examiner* — Piotr Poltorak (57) ABSTRACT

A system described herein may allow for the masking of user input and/or sensor data, which could otherwise be used to uniquely identify and track a user. For example, user inputs (e.g., keyboard or mouse inputs) and/or sensor data (e.g., data from a touchscreen, pressure sensor, gyroscope, etc.) may be normalized and randomized. The normalization and/or randomization may include modifying metadata associated with user inputs or sensor data (e.g., modification of timestamps and/or modification of raw data) prior to outputting the user inputs or sensor data to an application, and/or to a service that attempts to uniquely identify users based on such metadata.

20 Claims, 8 Drawing Sheets

(56) References Cited

U.S. PATENT DOCUMENTS

| | | | |
|---|---|---|---|
| 2005/0044390 A1* | 2/2005 | Trostle | G06F 21/83 713/188 |
| 2006/0101128 A1 | 5/2006 | Waterson | |
| 2007/0140504 A1* | 6/2007 | Tribble | H04R 5/02 381/73.1 |
| 2007/0208845 A1 | 9/2007 | Raheman et al. | |
| 2008/0080558 A1* | 4/2008 | Wang | H04L 65/607 370/474 |
| 2008/0292097 A1* | 11/2008 | Lin | G06F 21/14 380/28 |
| 2009/0132419 A1* | 5/2009 | Grammer | G06F 21/6245 705/50 |
| 2009/0278807 A1 | 11/2009 | Hu | |
| 2010/0052851 A1 | 3/2010 | Kaehler | |
| 2010/0058479 A1* | 3/2010 | Chen | G06F 21/83 726/26 |
| 2010/0235166 A1* | 9/2010 | Bardino | G10L 13/08 704/207 |
| 2013/0073849 A1 | 3/2013 | Wang | |
| 2013/0212677 A1 | 8/2013 | Wurster | |
| 2015/0261968 A1* | 9/2015 | Polyachenko | G06F 3/011 715/773 |
| 2015/0378968 A1* | 12/2015 | Varadarajan | G06F 11/368 715/237 |
| 2016/0380994 A1* | 12/2016 | Raju | H04L 63/083 726/7 |
| 2017/0141920 A1* | 5/2017 | Herder, III | G06F 21/575 |
| 2018/0129413 A1* | 5/2018 | Berger | G06F 3/021 |
| 2018/0160309 A1 | 6/2018 | Turgeman et al. | |
| 2018/0165473 A1 | 6/2018 | Debickes et al. | |
| 2019/0042791 A1* | 2/2019 | Dinov | G16H 10/60 |

OTHER PUBLICATIONS

Lucjan Hanzlik and Wojciech Wodo, "Identity Security in Biometric Systems based on Keystroking", International Conference on Security and Cryptography (SECRYPT), Jul. 2013. (Year: 2013).*

* cited by examiner

SYSTEMS AND METHODS FOR MASKING USER INPUT AND SENSOR DATA AT A USER DEVICE

CROSS-REFERENCE TO RELATED APPLICATION

This Application is a Continuation of co-pending U.S. patent application Ser. No. 15/719,233, filed on Sep. 28, 2017, titled "SYSTEMS AND METHODS FOR MASKING USER INPUT AND SENSOR DATA AT A USER DEVICE," the contents of which are herein incorporated by reference in their entirety.

BACKGROUND

Numerous techniques exist for tracking user behavior at a user device, including tracking users' locations, browsing history, content consumption history, etc. Devices and/or software (e.g., web browsers) provide some options, such as "private" or "incognito" browsing mode, for users to hide such information from services that track user behavior. However, other information can still be used to identify users, such as typing tendencies (e.g., the manner in which the user types on a keyboard of the user device) and/or other types of information, such as how the user moves the device (e.g., as measured by gyroscopes, accelerometers, etc.).

DETAILED DESCRIPTION OF THE PREFERRED EMBODIMENTS

The following detailed description refers to the accompanying drawings. The same reference numbers in different drawings may identify the same or similar elements.

Systems and/or methods, as described herein, may provide for the masking of information that could potentially be used to identify a user, even when the user has taken steps to prevent the tracking of his or her activities (e.g., when the user has activated a "private" browsing mode in a web browser, or has otherwise disabled a data monitoring service). For example, some embodiments described herein may cause a user device (e.g., a mobile phone, a laptop or desktop computer, a tablet computer, etc.) to "mask" a user's input and/or sensor readings taken by the user device, which may prevent certain services from identifying the user based on the manner in which the user inputs information (e.g., how quickly the user types, portions of a touchscreen that the user frequently touches, etc.) and/or based on sensor readings taken by the device (e.g., an angle at which the user typically holds the device, how hard the user presses a touchscreen when typing, etc.).

Figure 1:
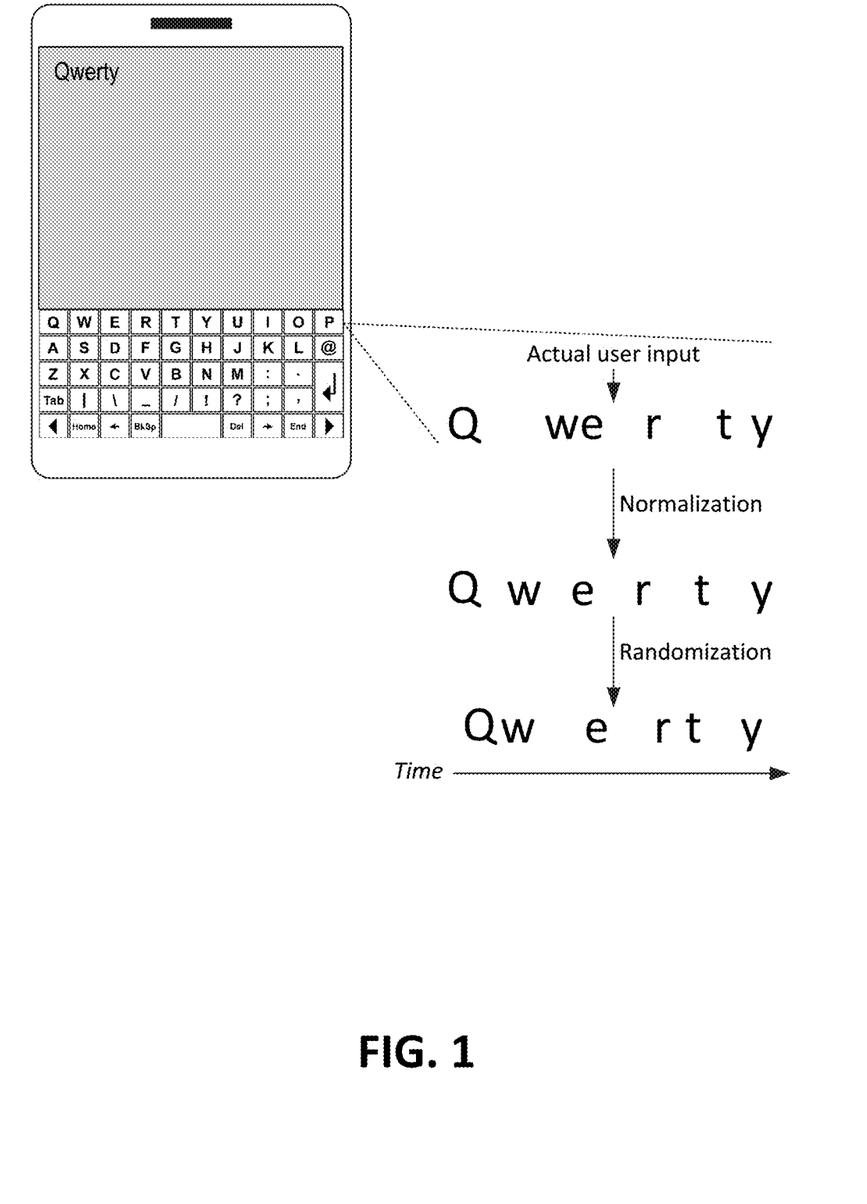
FIG. 1 illustrates an overview of one or more embodiments described herein.

For example, as shown in FIG. 1, a user may use a keyboard of a user device to input the letters "Qwerty". As denoted in the figure by the arrow labeled "Time", the letters may be inputted with differing amounts of delay in between each letter. For instance, the delay between the letters "Q" and "w" may be relatively long, and the delay between the letters "w" and "e" may be relatively short. This type of information may be used by services that track user behavior, and may be used to uniquely identify the user. That is, the delay in between typing certain letters, or combinations of letters, may tend to be relatively consistent for individual users, but may vary from user to user. The consistency for a given user, coupled with the variance between different users, may allow such information to be used to uniquely identify specific users, and by extension, may allow user activities to be tracked.

In accordance with some embodiments, the user's input may be intercepted, "masked," and then the masked input may be passed to its intended destination. In this manner, the user cannot be identified based on the user's tendencies (e.g., delays between typing certain letters or combinations of letters).

As described herein, masking a user's input may include two stages: (1) normalization, and (2) randomization. In the example shown in FIG. 1, normalization may entail causing the delay in between letters to be equal, as denoted by the equal spacing shown between each letter. Randomization may include introducing random (or pseudo-random) amounts of delay in between one or more of the letters, after normalization. In some embodiments, the reason for normalizing the delay before randomizing the delay is to prevent techniques from "reverse engineering" the actual delay in the user input by detecting the randomization and applying an inverse of the randomization function to arrive at the actual user input. In some embodiments, the user input may simply be masked by normalizing the input (and not randomizing the input).

In some embodiments, in lieu of intercepting the input, masking the input, and then outputting the input to its intended destination, metadata regarding the input may be modified. For instance, referring again to the example shown in FIG. 1, metadata may be generated by the user device, which indicates the delay in between each of the typed letters. In some embodiments, the metadata itself may be modified in a similar manner as described above (e.g., the metadata may first be modified to indicate an equal amount of delay in between each letter, and then may be modified to indicate a random amount of delay in between each letter). In these embodiments, services that analyze metadata to identify user behavior may be prevented from uniquely identifying users.

Figure 2:
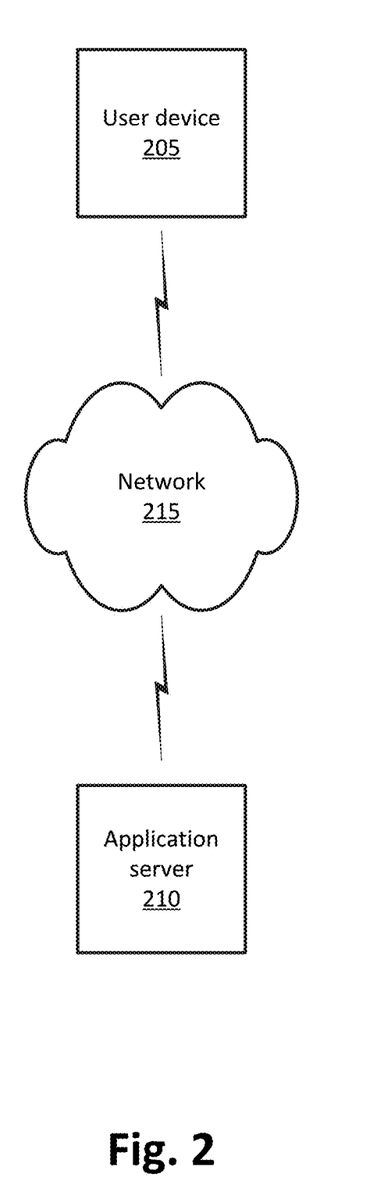
FIG. 2 illustrates an example environment in which one or more embodiments, described herein, may be implemented.

FIG. 2 illustrates an example environment 200, in which systems and/or methods described herein may be implemented. As shown in FIG. 2, environment 200 may include user device 205, application server 210, and network 215.

The quantity of devices and/or networks, illustrated in FIG. 2, is provided for explanatory purposes only. In practice, environment 200 may include additional devices and/or networks; fewer devices and/or networks; different devices and/or networks; or differently arranged devices and/or networks than illustrated in FIG. 2. For example, while not shown, environment 200 may include devices that facilitate or enable communication between various components shown in environment 200, such as routers, modems, gateways, switches, hubs, etc. Alternatively, or additionally, one or more of the devices of environment 200 may perform one or more functions described as being performed by another one or more of the devices of environments 200. Devices of environment 200 may interconnect with each other and/or other devices via wired connections, wireless connections, or a combination of wired and wireless connections. In some implementations, one or more devices of environment 200 may be physically integrated in, and/or may be physically attached to, one or more other devices of environment 200. Also, while "direct" connections are shown in FIG. 2 between certain devices, some devices may communicate with each other via network 215 (and/or another network).

User device 205 may include any computation and communication device that is capable of communicating with one or more networks (e.g., network 215). For example, user device 205 may include a device that receives content, such as web pages (e.g., that include text content and/or image content), streaming audio and/or video content, and/or other content, via an Internet connection and/or via some other delivery technique. In some implementations, user device 205 may be, may include, or may be a logical portion of, a radiotelephone, a personal communications system ("PCS") terminal (e.g., a device that combines a cellular radiotelephone with data processing and data communications capabilities), a personal digital assistant ("PDA") (e.g., a device that includes a radiotelephone, a pager, etc.), a smart phone, a laptop computer, a tablet computer, a camera, a television, a personal gaming system, a wearable device, and/or another type of computation and communication device.

Application server 210 may include one or more server devices (e.g., a single physical device or a distributed set of devices) that provide services to user device 205. For instance, application server 210 may provide gaming services, chat services, banking services, messaging services, telephony services, and/or some other type of service to user device 205. In some embodiments, application server 210 may be associated with (e.g., communicate with) a client application that executes on user device 205.

Network 215 may include one or more radio access networks ("RANs"), via which user device 205 may access one or more other networks or devices, a core network of a wireless telecommunications network, an IP-based packet data network ("PDN"), a wide area network ("WAN") such as the Internet, a private enterprise network, and/or one or more other networks. In some implementations, network 215 may be, or include, a cellular network, such as a Long-Term Evolution ("LTE") network, a Third Generation ("3G") network, a Fourth Generation ("4G") network, a Fifth Generation ("5G") network, a Code Division Multiple Access ("CDMA") network, etc. User device 205 may connect, via network 215, to data servers, application servers, other user devices 205, etc. Network 215 may be connected to one or more other networks, such as a public switched telephone network ("PSTN"), a public land mobile network ("PLMN"), and/or another network.

Figure 3:
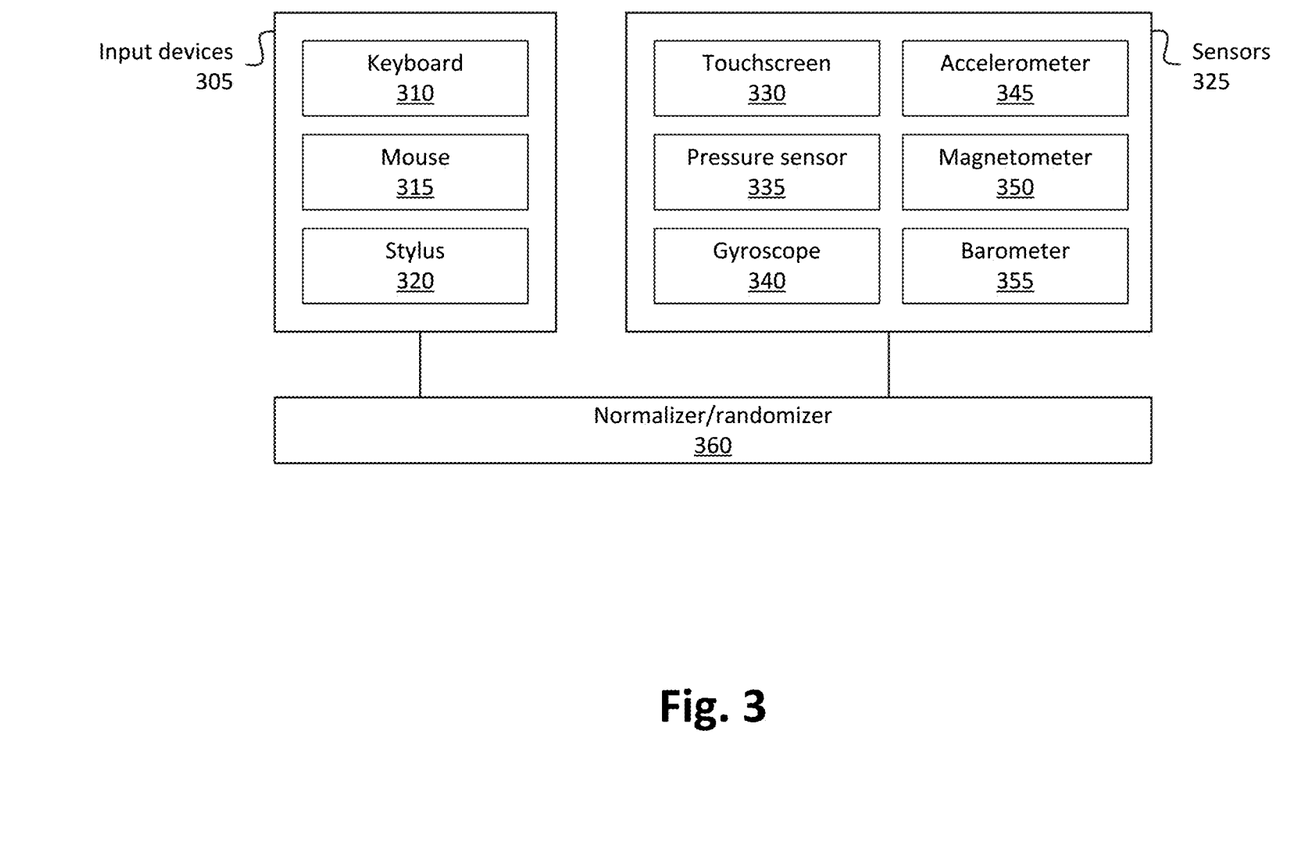
FIG. 3 illustrates example components of a device, according to one or more embodiments.

FIG. 3 illustrates example functional components of device 300. Device 300 may, in some embodiments, be, include, be included in, and/or otherwise correspond to user device 205. As shown, device 300 may include one or more input devices 305, one or more sensors 325, and normalizer/randomizer 360. The various components of device 300 may be implemented as hardware, software logic, and/or some combination thereof.

As shown, input devices 305 may include keyboard 310, mouse 315, and stylus 320. Keyboard 310 may, for instance, be a hardware keyboard and/or a "soft" keyboard (e.g., implemented via a touchscreen of device 300). Keyboard 310 may receive keypresses from a user of device 300, where each keypress corresponds to a letter, number, and/or some other character or function. In some embodiments, keyboard 310 may generate metadata regarding user inputs, such as a time at which a particular key was pressed, time in between keypresses, etc. In some embodiments, another component of device 300 may record metadata regarding user inputs received via keyboard 310.

Mouse 315 may receive user inputs related to moving a pointer around a display screen of device 300. Mouse 315 may include one or more buttons (e.g., left mouse button, right mouse button, middle mouse button, scroll wheel, etc.) and/or a pointer tracking device. In some embodiments, mouse 315 may generate metadata regarding user inputs, such as a position of the pointer in the display screen (along with corresponding timestamps that indicate when the pointer was positioned at a particular position in the display screen), and/or clicks of buttons received by mouse 315 (along with corresponding time stamps that indicate when such clicks were received). In some embodiments, another component of device 300 may record metadata regarding user inputs received via mouse 315.

Stylus 320 may be associated with user inputs that resemble "writing" on a touchscreen or other type of input device that is responsive to stylus 320. Stylus 320 may be used to receive freehand input motions, such as written text, drawings, etc. In some embodiments, mouse 315 may generate metadata regarding user inputs, such as a position of stylus 320 on a touchscreen or other input device (along with corresponding time stamps that indicate when stylus 320 was located at a particular position on a touchscreen or other input device). In some embodiments, another component of device 300 may record metadata regarding user inputs received via mouse 315. While input devices 305 were described above as including keyboard 310, mouse 315, and stylus 320, some embodiments may include additional, fewer, and/or different types of input devices.

Sensors 325 may include touchscreen 330, pressure sensor 335, gyroscope 340, accelerometer 345, magnetometer 350, and/or barometer 355. In some embodiments, one or more sensors 325 may operate in conjunction with one or more input devices 305 to detect user input. For instance, touchscreen 330 and/or pressure sensor 335 may be used to detect keypresses via keyboard 310, in embodiments where keyboard 310 is implemented as a "soft" keyboard displayed on a display device of device 300.

Touchscreen 330 may include, or be communicatively coupled to, a display device. Generally, touchscreen 330 may detect a user's touch on touchscreen 330, which may correspond to keypresses on a soft keyboard, selections of graphical elements displayed on the display device, or other touches on touchscreen 330. Touchscreen 330, and/or some other component of device 300, may generate metadata that indicates a user's operation of touchscreen 330. For instance, the metadata may indicate a position on touchscreen 330 that a user touched (along with corresponding time stamps that indicate when touchscreen 330 was touched at a particular position).

Pressure sensor 335 may detect pressure, such as pressure effected by a user's finger, stylus 320, and/or some other object or device. In some embodiments, pressure sensor 335 may be communicatively coupled to, and/or otherwise operate in conjunction with, touchscreen 330. For example, pressure sensor 335 may detect pressure when a user presses or touches touchscreen 330. Pressure sensor 335 may, in some embodiments, detect an amount of pressure (e.g., in terms of pounds per square inch ("PSI") and/or some other unit of pressure) effected by the user or other object. Pressure sensor 335, and/or some other component of device 300, may generate metadata that indicates an amount of pressure detected by pressure sensor 335 (along with corresponding time stamps that indicate when touchscreen 330 was touched at a particular position). In some embodiments, the metadata associated with pressure sensor 335 may be coupled with the metadata associated with touchscreen 330, which may indicate (1) a position on touchscreen 330 that was touched, (2) how heavy the pressure of the touch was, and (3) when the touch occurred.

Gyroscope 340, accelerometer 345, and/or magnetometer 350 may determine, or assist in determining, orientation information associated with device 300. In some embodiments, gyroscope 340, accelerometer 345, and/or magnetometer 350 may operate in concert to determine orientation information associated with device 300. For instance, gyroscope 340, accelerometer 345, and/or magnetometer 350 may determine the angles of orientation of device 300 in the x-, y-, and z-axes, and/or the orientation of device 300 with respect to the magnetic field of the Earth (e.g., north, south, east, west, etc.). Gyroscope 340, accelerometer 345, magnetometer 350, and/or some other component of device 300, may generate metadata that indicates an orientation determined by gyroscope 340, accelerometer 345, and/or magnetometer 350 (along with corresponding time stamps that indicate when touchscreen 330 was oriented in a particular way).

Barometer 355 may sense atmospheric pressure. In some embodiments, atmospheric pressure readings may assist in determining an altitude of device 300 (e.g., a height above sea level). Barometer 355, and/or some other component of device 300, may generate metadata that indicates an amount of atmospheric pressure detected by barometer 355 (along with corresponding time stamps that indicate when barometer 355 measured a particular atmospheric pressure reading).

While a set of sensors were discussed above as being included in sensors 325, some embodiments may utilize additional, fewer, and/or different sensors than those discussed above. For instance, sensors 325 may include sensors and/or other components that may determine the geographical location of device 300 (e.g., a Global Positioning System ("GPS") component and/or a component that receives location information from a wireless telecommunications network), an altimeter, a light sensor, a microphone, and/or other types of sensors. As with the example sensors discussed above, these sensors may also generate information that can be stored as metadata that indicates measurements taken by the various sensors, along with timestamps associated with the measurements.

Normalizer/randomizer 360 may normalize and/or randomize input data received from input devices 305 and/or sensors 325. As mentioned above, the normalization of sensor and/or input data may include modifying the data in a uniform manner, and then randomizing the normalized data. In some embodiments, normalizer/randomizer 360 may be implemented as hardware circuitry, software logic, and/or some combination thereof (e.g., one or more processors and/or other circuitry executing program instructions).

For example, with regard to input received via keyboard 310, normalization may entail standardizing an amount of time in between keypresses, and randomization may entail introducing random amounts of time in between keypresses. As another example, normalization of input received via mouse 315 may entail standardizing an amount of time in between clicks of the mouse, and randomization may entail introducing random amounts of time in between clicks of the mouse. Similarly, normalization of input received via stylus 320 may entail standardizing an amount of time in between strokes of stylus 320, and randomization may entail introducing random amounts of time in between strokes of stylus 320. As another example, normalization of input received via stylus 320 may entail standardizing an amount of time that elapses for each stroke of stylus 320, and randomization may entail introducing random amounts of time that elapse for each stroke of stylus 320.

In another example, normalization of sensor data received by touchscreen 330 may entail standardizing an amount of time in between swipes or touches received by touchscreen 330, and randomization may entail introducing random amounts of time in between swipes or touches received by touchscreen 330. In some embodiments, normalization of sensor data received by touchscreen 330 may entail standardizing an amount of time that a "held" touch was detected by touchscreen 330 (e.g., where a user holds his or her finger in one position on touchscreen 330 for a duration of time), and randomization may entail introducing a random amount of time that the held touch was detected by touchscreen 330.

In yet another example, normalization of sensor data received by pressure sensor 335 may entail standardizing an amount of pressure detected by pressure sensor 335 (e.g., essentially indicating that each touch or pressure sensed by pressure sensor 335 is a same amount of pressure). In some embodiments, randomizing the sensor data received by pressure sensor 335 may entail introducing random amounts of pressure for touches detected by pressure sensor 335. In some embodiments, normalization of the sensor data received by pressure sensor 335 may entail standardizing an amount of time in between touches or pressure detected by pressure sensor 335, and randomization may entail introducing a random amount of time in between touches or pressure detected by pressure sensor 335.

As another example, normalizing sensor data received via gyroscope 340, accelerometer 345, and/or magnetometer 350 may include standardizing orientation readings detected by gyroscope 340, accelerometer 345, and/or magnetometer 350. For instance, standardizing the orientation readings may include setting the orientation to one specific angle in each of the x-, y-, and/or z-coordinates, and/or may include setting the orientation to face one specific direction (e.g., due North, and/or some other direction) with respect to the Earth's magnetic field. Randomizing the sensor data received by gyroscope 340, accelerometer 345, and/or magnetometer 350 may entail introducing random angles I the x-, y-, and/or z-coordinates, and/or direction with respect to the Earth's magnetic field. In some embodiments, in addition to or in lieu of normalizing and randomizing the orientation readings, normalizing the orientation data may include standardizing an amount of time in between when sensor readings were received from gyroscope 340, accelerometer 345, and/or magnetometer 350, and randomizing the orientation data may include introducing a random amount of time in between sensor readings associated with gyroscope 340, accelerometer 345, and/or magnetometer 350.

In another example, normalizing sensor data received from barometer 355 may entail standardizing an atmospheric pressure reading received from barometer 355 (e.g., modifying the readings to 1.0 Standard Atmosphere). Randomizing the sensor data may entail introducing random amounts of atmospheric pressure.

Figure 4:
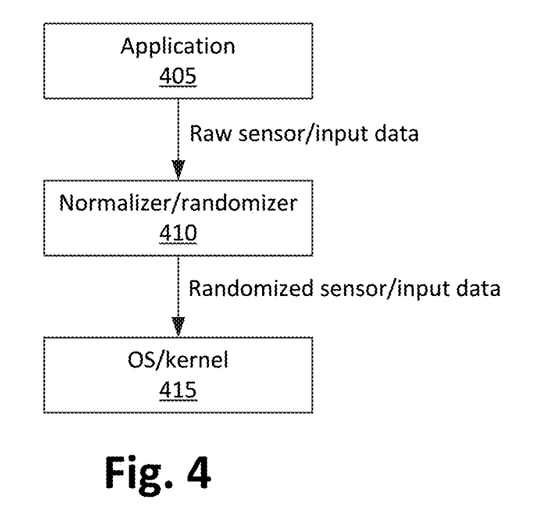
FIGS. 4 and 5 illustrate example data flows, according to one or more embodiments.
Figure 5:
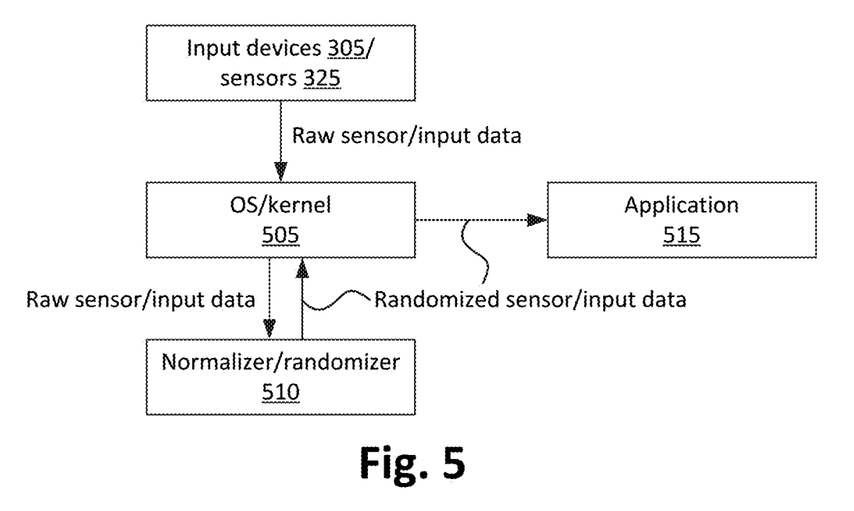

FIGS. 4 and 5 illustrate example data flows, according to one or more embodiments. For example, as shown in FIG.

4, application 405 (which may be an application executed by user device 205, such as a web browser, a game, a texting application, etc.) may receive sensor and/or input data. For instance, application 405 may have been designed to receive information from one or more input devices 305 and/or sensors 325, and provide the information to an operating system ("OS") and/or kernel 415 of user device 205.

In some embodiments, the information may be, or include, metadata regarding user input and/or sensor measurements (e.g., as similarly described above). In some embodiments, the information may be, or include, instructions to execute a particular action based on the user input and/or sensor measurements. For example, the information may relate to keypresses by a user of user device 205, and may include instructions to pass the keypresses to another component of user device 205 and/or to another device.

According to some embodiments, normalizer/randomizer 410 may intercept the raw sensor and/or input data, received from application 405. For instance, in some embodiments, application 405 may implement an Application Programming Interface ("API"), via which application 405 directly provides sensor and/or input data to normalizer/randomizer 410. In some embodiments, application 405 may flag certain types of data as being data that should be normalized and/or randomized, and/or may flag certain types of data that should not be normalized and/or randomized. For example, application 405 may indicate that user input received via keyboard 310 should be normalized and/or randomized, while indicating user input received via mouse 315 should not be normalized and/or randomized.

Normalizer/randomizer 410 may normalize and/or randomize the received sensor and/or input data, and provide the normalized and/or randomized sensor and/or input data to OS/kernel 415. OS/kernel 415 may proceed to process the normalized and/or randomized sensor and/or input data (e.g., execute instructions to provide the sensor and/or input data to an intended component of user device 205 or other device).

As shown in FIG. 5, normalizer/randomizer 510 may communicate with, and/or be integrated with, OS/kernel 505. In this manner, input devices 305, sensors 325, and/or applications running on user device 205 may not need to directly communicate with, or even be aware of, normalizer/randomizer 510. For instance, input devices 305 and/or sensors 325 may provide raw sensor and/or input data to OS/kernel 505, which may be consistent with "normal" operation of input devices 305 and/or sensors 325. As mentioned above, OS/kernel 505 may additionally, or alternatively, receive or generate metadata regarding the data received from input devices 305 and/or sensors 325. OS/kernel 505 may provide some or all of the raw sensor and/or input data to normalizer/randomizer 510, which may normalize and/or randomize the data, and provide the normalized/randomized data to OS/kernel 505. OS/kernel 505 may act on the normalized/randomized data, in lieu of on the raw data. For example, OS/kernel 505 may pass the normalized/randomized data to an intended destination of the data, such as an application running on user device 205 (e.g., application 515) and/or to another device. In this manner, an application running on user device 205 (e.g., which may monitor user interactions and/or sensor data) may receive normalized/randomized input/sensor data, in lieu of actual input/sensor data, which may make the user of user device 205 difficult or impossible to identify.

While example data flows are shown in FIGS. 4 and 5, in practice, different embodiments may utilize different arrangements or data flows to accomplish similar goals as discussed above, without departing from the spirit of the embodiments described herein.

Figure 6:
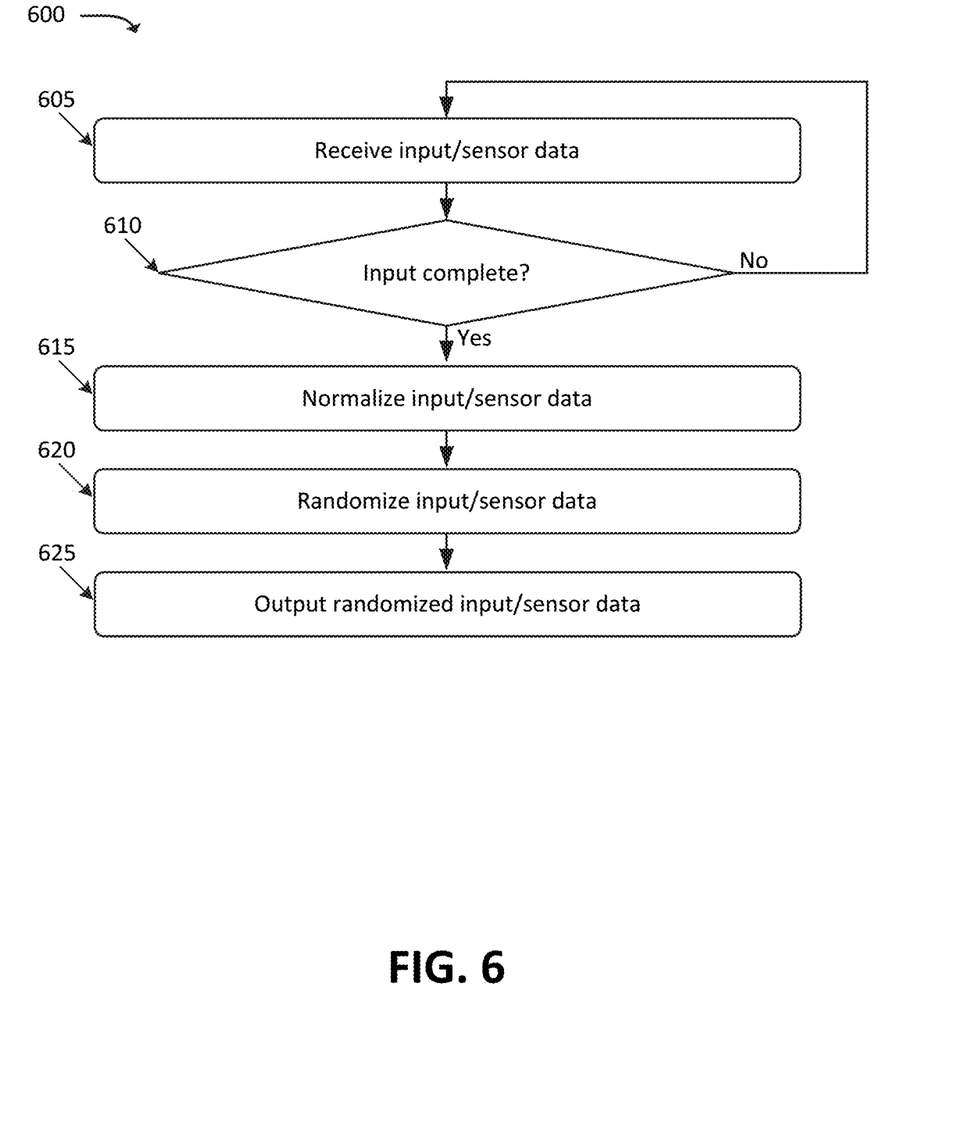
FIGS. 6 and 7 illustrate example processes for masking user input and/or sensor data.

FIG. 6 illustrates an example process 600 for randomizing and/or normalizing input and/or sensor data. In some embodiments, process 600 may be performed by user device 205 (e.g., by a normalizer/randomizer component of user device 205, such as normalizer/randomizer 360).

As shown, process 600 may include receiving (at 605) input and/or sensor data. For example, as discussed above, user device 205 may receive input and/or sensor data via one or more input devices 305 and/or sensors 325. As discussed above with respect to FIGS. 4 and 5, the normalizer/randomizer component may receive the input/sensor data from an application running on user device 205, from an operating system and/or kernel of user device 205, and/or from some other source.

Process 600 may also include determining (at 610) whether an input, associated with the input and/or sensor data, is complete. For example, user device 205 may determine whether a threshold amount of time has passed since the last input and/or sensor data was received. In some embodiments, user device 205 may separately track different types of input and/or sensor data. For instance, user device 205 may receive several device orientation readings within a 3-second time window, but may only receive one keypress during that time. User device 205 may determine that the keypress inputs are "complete," but may determine that orientation readings are still being received, and are therefore "not complete."

If the input is not complete (at 610—NO), process 600 may include continuing (at 605) to receive and/or wait for input and/or sensor data. If the input is complete (at 610—YES), then process 600 may include normalizing (at 615) and/or randomizing (at 620) the input and/or sensor data. Examples of normalizing and/or randomizing the input and/or sensor data were described above.

Process 600 may additionally include outputting (at 625) the normalized and randomized input and/or sensor data. For example, as discussed above with respect to FIGS. 4 and 5, the normalized and randomized data may be provided to an OS/kernel of user device 205, an application running on user device 205, and/or some other component or device.

Figure 7:
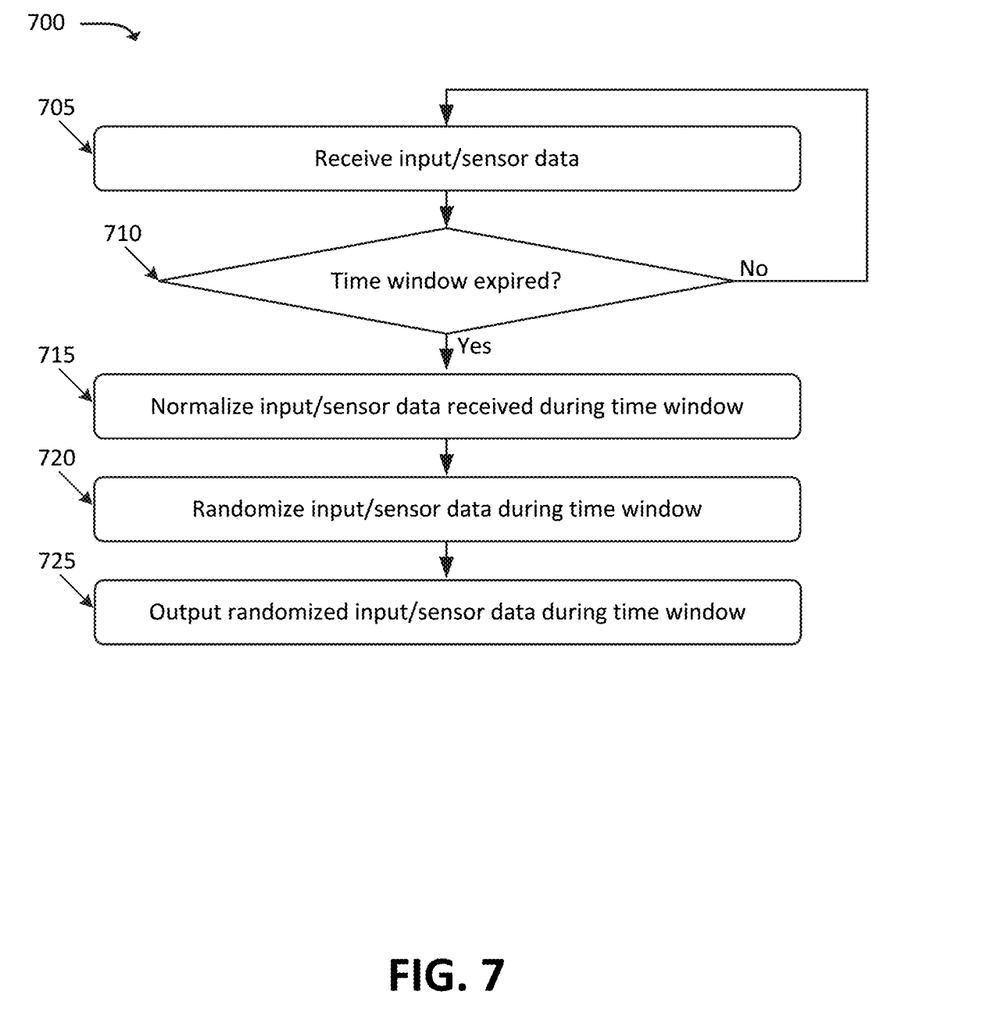

FIG. 7 illustrates another example process 700 for randomizing and/or normalizing input and/or sensor data. In some embodiments, process 700 may be performed by user device 205 (e.g., by a normalizer/randomizer component of user device 205, such as normalizer/randomizer 360).

As shown, process 700 may include receiving (at 705) input and/or sensor data. For example, as discussed above, user device 205 may receive input and/or sensor data via one or more input devices 305 and/or sensors 325. As discussed above with respect to FIGS. 4 and 5, the normalizer/randomizer component may receive the input/sensor data from an application running on user device 205, from an operating system and/or kernel of user device 205, and/or from some other source.

Process 700 may also include determining (at 710) whether a time window has expired. For example, user device 205 may track input/sensor data received during rolling time windows (e.g., time windows having a duration of 100 milliseconds, 500 milliseconds, 1 second, and/or some other duration of time).

If a given time window has not expired (at 710—NO), process 700 may include continuing (at 705) to receive and/or wait for input and/or sensor data. If the time window has expired, (at 710—YES), then process 700 may include normalizing (at 715) and/or randomizing (at 720) the input and/or sensor data. Examples of normalizing and/or randomizing the input and/or sensor data were described above.

Process 700 may additionally include outputting (at 725) the normalized and randomized input and/or sensor data. For example, as discussed above with respect to FIGS. 4 and 5, the normalized and randomized data may be provided to an OS/kernel of user device 205, an application running on user device 205, and/or some other component or device. When one time window has expired, user device 205 may continue tracking input/sensor data during a successive time window, such that input/sensor data is continuously monitored during discrete time windows. In some embodiments, splitting up the input into discrete time windows may be beneficial, in that the use of time windows (e.g., relatively short time windows) may make the modification of the user input difficult or impossible for a user to perceive.

Figure 8:
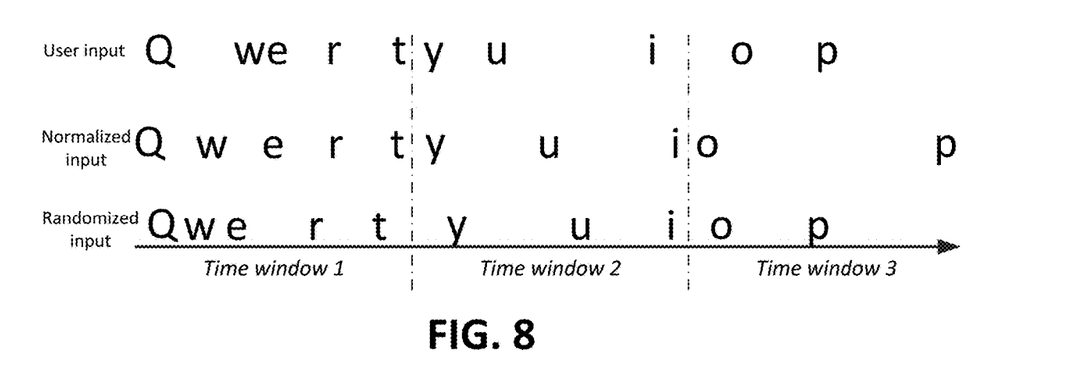
FIGS. 8-10 conceptually illustrate various techniques for masking user input and/or sensor data.

FIG. 8 conceptually illustrates process 700, in which user inputs/sensor data is normalized and randomized on a rolling basis. While FIG. 8 is described in the concept of keypresses received by a keyboard (e.g., keyboard 310), similar concepts may be applied to any of input devices 305 or sensors 325. As shown, during a first time window ("Time window 1"), the letters "Qwert" may be received by user device 205. As additionally shown, the time in between receiving the "Q" and the "w" keypresses may be relatively long, while the time in between receiving the "w" and "e" keypresses may be relatively short.

Once normalized, the input during Time window 1 may be the same keypresses as the raw input data ("Qwert"), but with the same amount of time in between each of the keypresses. Once randomized, the input during Time window 1 may be the same keypresses as the raw and the normalized input data, but with different (e.g., randomized) amounts of time in between the keypresses, as compared to the raw input data. Similar techniques may be applied during successive time windows (i.e., Time window 2 and Time window 3).

Figure 9:
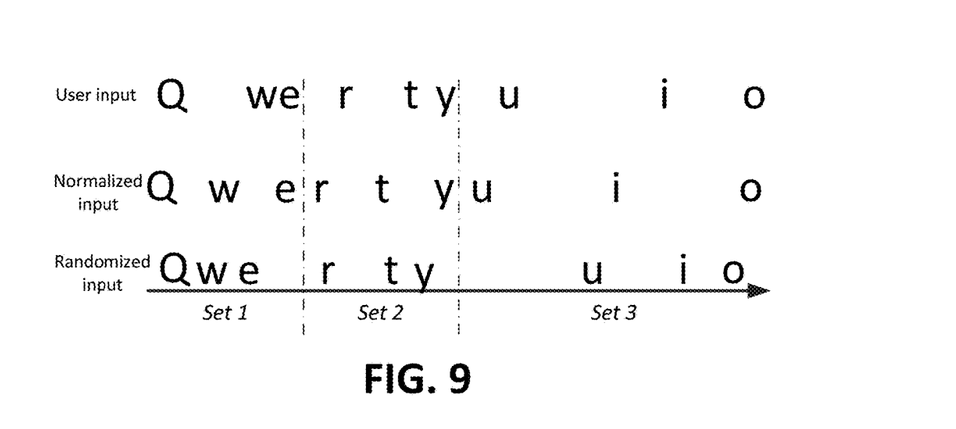

FIG. 9 conceptually illustrates a technique in which a quantity of inputs is used as the basis for when normalization/randomization should occur. While FIG. 9 is described in the concept of keypresses received by a keyboard (e.g., keyboard 310), similar concepts may be applied to any of input devices 305 or sensors 325. In this example, three inputs make up one "set" of inputs, where normalization/randomization is performed on each set of inputs. For example, the first set ("Set 1") includes "Qwe", Set 2 includes "rty", and Set 3 includes "uio". The normalization and randomization may be performed on each set of inputs.

Figure 10:
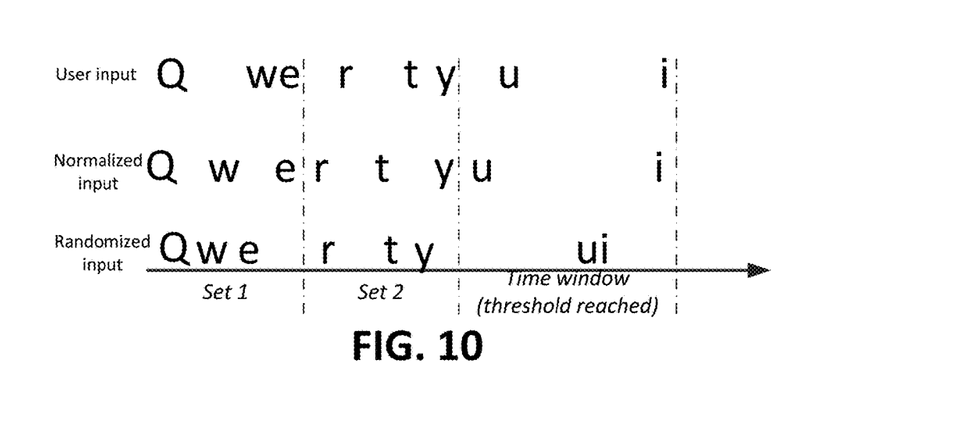

FIG. 10 conceptually illustrates a hybrid approach, in a quantity of inputs is used as the basis for when normalization/randomization should occur, so long as the inputs occur within a threshold time window. For instance, the inputs "Qwe" and "rty" may be received within a threshold amount of time and may thus be considered as discrete sets upon which to perform normalization and randomization. However, the inputs "ui" may be received relatively slowly, and a threshold time may expire before a third input is received. Thus, "ui" may be treated as its own set of inputs upon which normalization and randomization should be performed.

Figure 11:
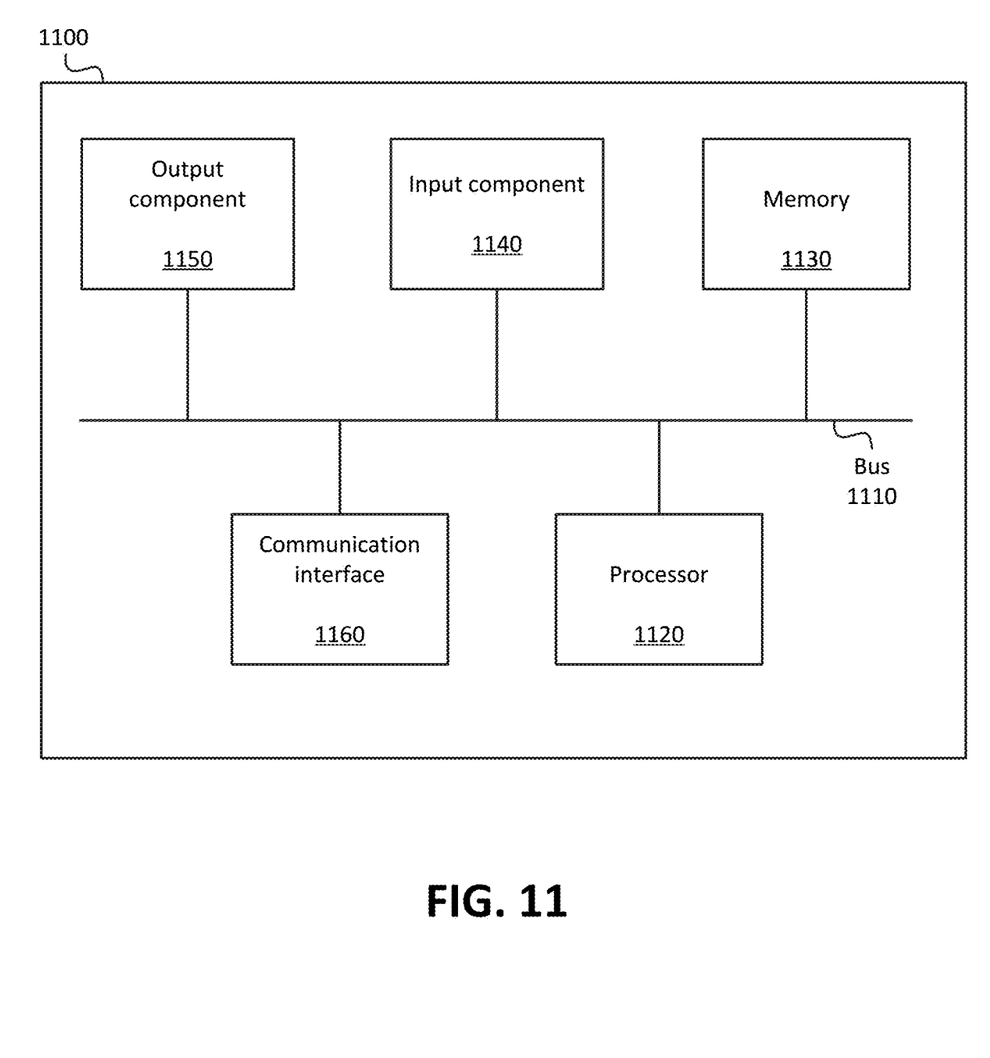
FIG. 11 illustrates example components of one or more devices, according to one or more embodiments described herein.

FIG. 11 illustrates example components of device 1100. One or more of the devices described above may include one or more devices 1100. Device 1100 may include bus 1110, processor 1120, memory 1130, input component 1140, output component 1150, and communication interface 1160. In another implementation, device 1100 may include additional, fewer, different, or differently arranged components.

Bus 1110 may include one or more communication paths that permit communication among the components of device 1100. Processor 1120 may include a processor, microprocessor, or processing logic that may interpret and execute instructions. Memory 1130 may include any type of dynamic storage device that may store information and instructions for execution by processor 1120, and/or any type of non-volatile storage device that may store information for use by processor 1120.

Input component 1140 may include a mechanism that permits an operator to input information to device 1100, such as a keyboard, a keypad, a button, a switch, etc. Output component 1150 may include a mechanism that outputs information to the operator, such as a display, a speaker, one or more light emitting diodes ("LEDs"), etc. Input component 1140 may include one or more input devices and/or sensors (e.g., input devices 305 and/or sensors 325, as described above).

Communication interface 1160 may include any transceiver-like mechanism that enables device 1100 to communicate with other devices and/or systems. For example, communication interface 1160 may include an Ethernet interface, an optical interface, a coaxial interface, or the like. Communication interface 1160 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 1100 may include more than one communication interface 1160. For instance, device 1100 may include an optical interface and an Ethernet interface.

Device 1100 may perform certain operations relating to one or more processes described above. Device 1100 may perform these operations in response to processor 1120 executing software instructions stored in a computer-readable medium, such as memory 1130. A computer-readable medium may be defined as a non-transitory memory device. A memory device may include space within a single physical memory device or spread across multiple physical memory devices. The software instructions may be read into memory 1130 from another computer-readable medium or from another device. The software instructions stored in memory 1130 may cause processor 1120 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

For example, while series of signals have been described with regard to FIGS. 4-7, the order of the signals may be modified in other implementations. Further, non-dependent signals may be performed in parallel. Additionally, while the figures have been described in the context of particular devices performing particular acts, in practice, one or more other devices may perform some or all of these acts in lieu of, or in addition to, the above-mentioned devices.

The actual software code or specialized control hardware used to implement an embodiment is not limiting of the embodiment. Thus, the operation and behavior of the embodiment has been described without reference to the specific software code, it being understood that software and control hardware may be designed based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

Some implementations are described herein in conjunction with thresholds. To the extent that the term "greater than" (or similar s) is used hereinto describe a relationship of a value to a threshold, it is to be understood that the term "greater than or equal to" (or similar terms) could be similarly contemplated, even if not explicitly stated. Similarly, to the extent that the term "less than" (or similar terms) is used herein to describe a relationship of a value to a threshold, it is to be understood that the term "less than or equal to" (or similar terms) could be similarly contemplated, even if not explicitly stated. Further, the term "satisfying," when used in relation to a threshold, may refer to "being greater than a threshold," "being greater than or equal to a threshold," "being less than a threshold," "being less than or equal to a threshold," or other similar terms, depending on the appropriate context.

To the extent the aforementioned implementations collect, store, or employ personal information provided by individuals, it should be understood that such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A device, comprising:
one or more processors configured to:
   receive user input according to a first input pattern, the first input pattern comprising:
      a plurality of user inputs comprising a plurality of keystrokes, and
      a first set of durations associated with the plurality of user inputs, wherein the first set of durations includes a first duration in between receiving two particular keystrokes of the plurality of keystrokes;
   mask the user input by changing the first input pattern to a second input pattern, wherein changing the first input pattern to the second input pattern comprises:
      generating a second set of durations, wherein the second set of durations includes a different second duration in between the two particular keystrokes, the second set of durations having been generated by:
         replacing a plurality of durations, of the first set of durations, associated with a plurality of user inputs, with a particular pre-determined duration, and
         performing a randomization function on each duration of the replaced plurality of durations; and
   output the masked user input to one or more applications being executed by the device, by providing the user input according to the second input pattern to the one or more applications without outputting the user input, according to the first input pattern, to the one or more applications.

2. The device of claim 1,
wherein the plurality of user inputs comprises:
   a first set of user inputs received during a first time period, and
   a second set of user inputs received during a second time period,
wherein changing the first input pattern to the second input pattern further comprises:
   replacing each duration, in between the user inputs of the first set of user inputs, with a first pre-determined duration, and
   replacing each duration, in between the user inputs of the second set of user inputs, with a different second pre-determined duration.

3. The device of claim 2, wherein changing the first input pattern to the second input pattern further comprises:
   replacing each duration, in between the user inputs of the first set of user inputs, with a respective randomized duration that is based on a randomization function performed on the first pre-determined duration, and
   replacing each duration, in between the user inputs of the second set of user inputs, with a respective randomized duration that is based on a randomization function performed on the second pre-determined duration.

4. The device of claim 1, wherein the one or more processors are further configured to determine that the plurality of user inputs meets a threshold quantity of user inputs, wherein the masking is performed based on determining that the plurality of user inputs meets the threshold quantity of user inputs.

5. The device of claim 1, wherein outputting the masked user input to the one or more applications includes providing the two particular keystrokes to the one or more applications without indicating, to the one or more applications, the first duration between receiving the two particular keystrokes.

6. The device of claim 1, wherein the two particular keystrokes each indicate a respective alphanumeric character.

7. The device of claim 1, wherein the one or more processors are further configured to:
   determine that the plurality of user inputs comprises at least a threshold quantity of user inputs;
   identify a first set of user inputs, of the plurality of user inputs, wherein the first set of user inputs includes the threshold quantity of user inputs; and
   identify a second set of user inputs, of the plurality of user inputs, wherein the second set of user inputs is different from the first set of user inputs, and
   wherein changing the first input pattern to the second input pattern further comprises:
      replacing each duration, in between the user inputs of the first set of user inputs, with a first pre-determined duration, and
      replacing each duration, in between the user inputs of the second set of user inputs, with a different second pre-determined duration.

8. A method, comprising:
   receiving user input according to a first input pattern, the first input pattern comprising:
      a plurality of user inputs comprising a plurality of keystrokes, and
      a first set of durations associated with the plurality of user inputs, wherein the first set of durations includes a first duration in between receiving two particular keystrokes of the plurality of keystrokes;
   masking the user input by changing the first input pattern to a second input pattern, wherein changing the first input pattern to the second input pattern comprises:
      generating a second set of durations, wherein the second set of durations includes a different second duration in between the two particular keystrokes, the second set of durations having been generated by:
         replacing a plurality of durations, of the first set of durations, associated with a plurality of user inputs, with a particular pre-determined duration, and
         performing a randomization function on each duration of the replaced plurality of durations; and
      outputting the masked user input to one or more applications being executed by the device, by providing the user input according to the second input pattern to the one or more applications without outputting the user input, according to the first input pattern, to the one or more applications.

9. The method of claim 8,
   wherein the plurality of user inputs comprises:
      a first set of user inputs received during a first time period, and
      a second set of user inputs received during a second time period,
   wherein changing the first input pattern to the second input pattern further comprises:
      replacing each duration, in between the user inputs of the first set of user inputs, with a first pre-determined duration, and
      replacing each duration, in between the user inputs of the second set of user inputs, with a different second pre-determined duration.

10. The method of claim 9, wherein changing the first input pattern to the second input pattern further comprises:
    replacing each duration, in between the user inputs of the first set of user inputs, with a respective randomized duration that is based on a randomization function performed on the first pre-determined duration, and
    replacing each duration, in between the user inputs of the second set of user inputs, with a respective randomized duration that is based on a randomization function performed on the second pre-determined duration.

11. The method of claim 8, further comprising determining that the plurality of user inputs meets a threshold quantity of user inputs, wherein the masking is performed based on determining that the plurality of user inputs meets the threshold quantity of user inputs.

12. The method of claim 8, wherein outputting the masked user input to the one or more applications includes providing the two particular keystrokes to the one or more applications without indicating, to the one or more applications, the first duration between receiving the two particular keystrokes.

13. The method of claim 8, wherein the two particular keystrokes each indicate a respective alphanumeric character.

14. The method of claim 8, further comprising:
    determining that the plurality of user inputs comprises at least a threshold quantity of user inputs;
    identifying a first set of user inputs, of the plurality of user inputs, wherein the first set of user inputs includes the threshold quantity of user inputs; and
    identifying a second set of user inputs, of the plurality of user inputs, wherein the second set of user inputs is different from the first set of user inputs, and
    wherein changing the first input pattern to the second input pattern further comprises:
       replacing each duration, in between the user inputs of the first set of user inputs, with a first pre-determined duration, and
       replacing each duration, in between the user inputs of the second set of user inputs, with a different second pre-determined duration.

15. A non-transitory computer-readable medium, storing a set of processor-executable instructions to:
    receive user input according to a first input pattern, the first input pattern comprising:
       a plurality of user inputs comprising a plurality of keystrokes, and
       a first set of durations associated with the plurality of user inputs, wherein the first set of durations includes a first duration in between receiving two particular keystrokes of the plurality of keystrokes;
    mask the user input by changing the first input pattern to a second input pattern, wherein changing the first input pattern to the second input pattern comprises:
       generating a second set of durations, wherein the second set of durations includes a different second duration in between the two particular keystrokes, the second set of durations having been generated by:
          replacing a plurality of durations, of the first set of durations, associated with a plurality of user inputs, with a particular pre-determined duration, and
          performing a randomization function on each duration of the replaced plurality of durations; and output the masked user input to one or more applications being executed by the device, by providing the user input according to the second input pattern to the one or more applications without outputting the user input, according to the first input pattern, to the one or more applications.

16. The non-transitory computer-readable medium of claim 15, wherein outputting the masked user input to the one or more applications includes providing the two particular keystrokes to the one or more applications without indicating, to the one or more applications, the first duration between receiving the two particular keystrokes.

17. The non-transitory computer-readable medium of claim 15, wherein the two particular keystrokes each indicate a respective alphanumeric character.

18. The non-transitory computer-readable medium of claim 15, wherein the set of processor-executable instructions further include processor-executable instructions to:
determine that the plurality of user inputs comprises at least a threshold quantity of user inputs;
identify a first set of user inputs, of the plurality of user inputs, wherein the first set of user inputs includes the threshold quantity of user inputs; and
identify a second set of user inputs, of the plurality of user inputs, wherein the second set of user inputs is different from the first set of user inputs, and
wherein changing the first input pattern to the second input pattern further comprises:
replacing each duration, in between the user inputs of the first set of user inputs, with a first pre-determined duration, and
replacing each duration, in between the user inputs of the second set of user inputs, with a different second pre-determined duration.

19. The non-transitory computer-readable medium of claim 15,
wherein the plurality of user inputs comprises:
a first set of user inputs received during a first time period, and
a second set of user inputs received during a second time period,
wherein changing the first input pattern to the second input pattern further comprises:
replacing each duration, in between the user inputs of the first set of user inputs, with a first pre-determined duration, and
replacing each duration, in between the user inputs of the second set of user inputs, with a different second pre-determined duration.

20. The non-transitory computer-readable medium of claim 19, wherein changing the first input pattern to the second input pattern further comprises:
replacing each duration, in between the user inputs of the first set of user inputs, with a respective randomized duration that is based on a randomization function performed on the first pre-determined duration, and
replacing each duration, in between the user inputs of the second set of user inputs, with a respective randomized duration that is based on a randomization function performed on the second pre-determined duration.

* * * * *